United States Patent [19]

Rau

[11] 4,309,181
[45] Jan. 5, 1982

[54] α-HYDRAZONO α-PHENYL ACETONITRILES, THEIR PREPARATION AND THEIR APPLICATION AS DISPERSED DYESTUFFS FOR THE COLORATION OF ARTIFICIAL OR SYNTHETIC MATERIALS

[75] Inventor: Manfred C. Rau, Thuit-Anger par Amfreville la Campagne, France

[73] Assignee: Produits Chimiques Ugine Kuhlmann, Courbevoie, France

[21] Appl. No.: 108,255

[22] Filed: Dec. 31, 1979

[30] Foreign Application Priority Data

Jan. 19, 1979 [FR] France ............... 79 01328

[51] Int. Cl.³ ............ D06P 1/00; C07C 121/78
[52] U.S. Cl. ................. 8/636; 260/465 D; 260/465 E
[58] Field of Search ........ 260/465 E, 465 D; 8/636

[56] References Cited

FOREIGN PATENT DOCUMENTS 869155 1/1979 Belgium .

OTHER PUBLICATIONS

Laszlo, Talanta, vol. 17, pp. 161–165, (1970).
Bazavova et al., Chemical Abstracts, vol. 80, 120455a, (1974).
Bhaskare et al., Chemical Abstracts, vol. 83, 107665m, (1975).
Vanghelovici, Chemical Abstracts, vol. 22, pp. 3640–3641, (1928).

Primary Examiner—Dolph H. Torrence
Attorney, Agent, or Firm—Beveridge, DeGrandi, Kline & Lunsford

[57] ABSTRACT

The present invention relates to new α-hydrazono α-phenyl acetonitriles, which can be used in particular as disperse dye-stuffs for the coloration of artificial or synthetic materials. They may be represented by the general formula:

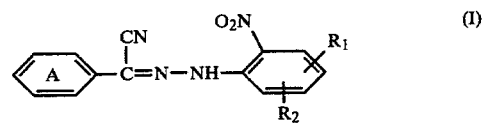

in which $R_1$ represents a hydrogen or halogen atom or a nitro, trifluoromethyl, alkyl or alkoxy group, $R_2$ represents a hydrogen or halogen atom or a cyano group, and the benzene nucleus A carries 1 to 3 identical or different substituents selected from halogen atoms and the trifluoromethyl, alkyl, alkoxy and —$NR_3R_4$ groups, $R_3$ representing a possibly substituted alkyl group and $R_4$ representing a hydrogen atom or a possibly substituted alkyl group. These compounds provide colorations which are very fast to light on polyester fibers.

23 Claims, No Drawings

α-HYDRAZONO α-PHENYL ACETONITRILES, THEIR PREPARATION AND THEIR APPLICATION AS DISPERSED DYESTUFFS FOR THE COLORATION OF ARTIFICIAL OR SYNTHETIC MATERIALS

The present invention relates to new α-hydrazono α-phenyl acetonitriles which can be used in particular as disperse dyestuffs for the coloration of artificial or synthetic materials.

The compounds according to the invention may be represented by the general formula:

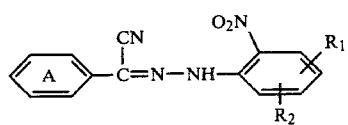   (I)

in which $R_1$ represents a hydrogen or halogen atom or a nitro, trifluoromethyl, alkyl or alkoxy group, $R_2$ represents a hydrogen or halogen atom or a cyano group and the benzene nucleus A carries 1 to 3 identical or different substituents selected from halogen atoms and the trifluoromethyl, alkyl, alkoxy and $-NR_3R_4$ groups, $R_3$ representing an alkyl group which may be substituted and $R_4$ representing a hydrogen atom or an alkyl group which may be substituted.

The halogen atoms are preferably chlorine or bromine. The alkyl or alkoxy groups preferably contain 1 to 4 carbon atoms and are in particular the methyl, methoxy and ethoxy groups. The alkyl groups represented by $R_3$ and $R_4$ may be identical or different and may be substituted; for example, by halogen atoms or hydroxy, acyloxy, carbalkoxy, cyano or alkoxy groups. The acyloxy groups may contain from 2 to 5 carbon atoms and are preferably the acetoxy group.

The compounds are preferred whose benzene nucleus A carries one or two substituents, especially those whose nucleus A only carries a single substituent.

The compounds of formula (I) may be prepared by reacting the diazo derivative of an o-nitro-aniline of the formula:

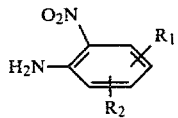   (II)

with a compound of the formula:

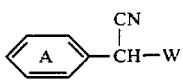   (III)

in which formulae A, $R_1$ and $R_2$ have the same definitions as above and W represents an eliminable electro-attracting group, for example an acyl group and in particular an acetyl group.

The reaction of the diazo derivative of o-nitro-aniline of formula (II) with the compound of formula (III) is effected in the usual coupling conditions, the coupling component of formula (III) being able to be dissolved in water as such or in the form of its sodium salt or in an organic solvent, such as acetic acid and ethanol, or in a mixture of these solvents with water.

The group W is generally eliminated automatically during and/or after the coupling reaction, the speed of this elimination being dependent upon the substituents $R_1$ and $R_2$ and upon the nature of the group W. To accelerate or terminate eventually the elimination of the group W, the reaction product can be taken up again, preferably to the boiling point, in an organic solvent such as, for example, acetic acid, methanol or ethanol.

Most of the compounds of formula (III) are known (cf. for example Bull. Soc. Chim. Fr. (5), 13, 1946, P. 271; J.C.S., 1944, P. 612, and J.A.C.S. 73 1951, P. 3758–3762). They may be prepared, for example, by reacting an organic ester, such as ethyl acetate, with the corresponding nitrile of the formula:

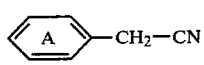   (IV)

in the presence of a strong base, such as sodium ethylate, in ethanol at the boiling point.

The compounds according to the invention are perfectly suitable for dyeing and printing all materials which can be dyed in disperse dyestuffs, in particular those based on hydrophobic fibers, such as polyurethane fibers, polyolefin fibers, such as polypropylene which is unmodified or has been modified by basic treatment or with nickel, chlorinated polyolefin fibers, cellulose diacetate or triacetate fibers, and especially polyamide fibers such as Nylon-6, Nylon-6,6 and Nylon-12, aromatic polyesters such as those of terephthalic acid and ethylene glycol or 1,4-dimethylol cyclohexane or mixed polymers of terephthalic and isophthalic acid with ethylene glycol.

The application of the dyestuffs according to the invention may be effected according to any known coloration technique which utilizes disperse dyestuffs.

Thus, for the dyeing in aqueous baths, the dyestuffs according to the invention, which are insoluble or very weakly soluble in water, are used advantageously in the finely divided form, and the operation is conducted in the presence of dispersants, such as the residual sulfite liquor of cellulose or synthetic detergents, and a combination of various wetting agents and dispersants. In general, it is advantageous to convert the dyestuffs to be used, before their application, into a tinctorial preparation containing the dispersant and the finely divided dyestuff in such a form that a fine dispersion is obtained by diluting the preparation with water. Such tinctorial preparations may be obtained in a known manner, for example by grinding the dyestuff, which is in dry or wet form, with or without the addition of dispersants during this grinding. After grinding in the wet, tinctorial preparations containing auxiliary textile agents and the dyestuff are obtained by subsequent drying.

Examples of advantageous dispersants in the non-ionic category include the addition products of 8 moles of ethylene oxide with 1 mole of p.tertio-octylphenol, 15 to 16 moles of ethylene oxide with castor oil, 20 moles of ethylene oxide with the alcohol $C_{16}H_{33}OH$, the addition products of ethylene oxide with di-[α-phenylethyl]-phenols, polyethylene oxide-tertio-dodecyl thioethers, polyamine-polyglycol ethers, and the addition products of 15 or 30 moles of ethylene oxide with one mole of dodecylamine or stearylamine.

Examples of anionic dispersants may be the sulfuric esters of fatty alcohols containing 8 to 10 carbon atoms, the sulfuric esters of the addition products of ethylene oxide arising from the corresponding fatty amides or alkylated phenols having 8 to 12 carbon atoms in the alkyl radical, the sulfonic esters containing alkyl radicals containing 8 to 20 carbon atoms, the sulfation products of fatty acids and unsaturated oils, the phosphoric esters containing alkyl radicals containing 8 to 20 carbon atoms, the soaps of fatty acids, the alkylaryl sulfonates, the condensation products of formaldehyde with naphthalene sulfonic acid plus the lignin sulfonates.

The suitable cationic dispersants are quaternary compounds of ammonium which contain alkyl or aralkyl radicals containing 8 to 20 carbon atoms.

The tinctorial preparations may also contain organic solvents, in addition to the dispersants, especially those which boil at above 100° C., which are advantageously miscible with water, such as mono and dialkyl glycol ethers, dioxan, dimethylformamide or -acetamide, tetramethylene sulfone or dimethyl sulfoxide. It is advantageous to grind the dyestuff, the dispersant and the solvent conjointly. It is also possible to use solvents on their own instead of the dispersant, but the tinctorial preparations must contain either a dispersant or a solvent.

The polyester fibers are dyed with the dyestuffs according to the invention in aqueous dispersion according to the processes used for polyesters. The polyesters of aromatic polycarboxylic acid and polyalcohol are preferably dyed at temperatures above 100° C. and under pressure. The dyeing may also be effected at the boiling point of the dye bath in the presence of carriers such as, for example, polyphenols, diphenyl-polychlorobenzene compounds, or similar auxiliary products, or also according to the Thermosol process, i.e. by foularding with subsequent treatment in the hot, for example, a thermofixation at 180°-210° C. Cellulose diacetate fibers are advantageously dyed at temperatures of 80°-85° C., whereas cellulose triacetate fibers are dyed at the boiling point of the dye bath. It is not necessary to use carriers for dyeing cellulose diacetate or polyamide fibers.

For thermofixation of the dyestuff, the foularded polyester fabric is heated, advantageously after previous drying, e.g. in a current of hot air at temperatures above 100° C., advantageously between 180° and 210° C. inclusive. The dyeings which are obtained may undergo a subsequent treatment, for example by heating in an aqueous solution of a non-ionic detergent.

Instead of impregnation, the dyestuffs according to the invention may also be applied by printing. For this purpose, a printing ink is used containing the finely dispersed dyestuff in addition to the usual auxiliary agents, such as the wetting and thickening agents.

The dyestuffs according to the invention may also be applied in solvent medium, for example in perchloroethylene alone or in admixture with 5-10% of dimethyl formamide or methanol.

With the dyestuffs according to the invention, full-bodied dyeings and printings are obtained with good fastness qualities, in particular fastness to thermofixation, sublimation, creasing, flue gases, over-dyeing, drycleaning, chlorine and wetness, for example water, washing and perspiration.

The dyestuffs according to the invention may also be used for the spin-dyeing of polyamides, polyesters and polyolefins. The polymer to be dyed, in the form of a powder, particles, chips or fully prepared spinning solutions or in the melted state, is preferably mixed with the dyestuff which is incorporated in dry form or in the form of a dispersion or solution in a possibly volatile solvent. After the homogeneous distribution of the dyestuff in the solution or in the melted mass of the polymer, the mixture is treated in a known manner by molding, pressure or extrusion, to obtain fibers, filaments, monofilaments, films, etc. With the dyestuffs according to the invention, intense and uniform colorations are obtained which have good fastness to light and good general fastnesses.

The dyestuffs according to the invention are particularly distinguished by their good general properties of application (affinity and fastness to light) on polyester fibers. On these fibers, the dyestuffs according to the invention are much more fast to light than the compound of the formula:

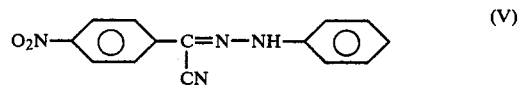

(V)

described in the Talanta review 1970, 17(2), Pages 161-5 (cf. Chemical Abstracts Vol. 72, 1970, No. 106721n) and presented as an acid/base indicator.

In the non-limiting examples hereinafter and throughout the specification and claims, the parts and percentages are understood to be by weight, unless otherwise stated. The parts by weight and the parts by volume are in the same ratio as the gram and milliliter.

EXAMPLE 1

9.15 parts of 2,4-dinitroaniline are dissolved in 60 parts by volume of 94% sulfuric acid, then the mixture is cooled to 0° C. and diazotized at this temperature by means of a solution of 3.45 parts of sodium nitrite in 46 parts by volume of 94% sulfuric acid. Introduced into the solution of the diazo compound thus formed is a solution of 9.8 parts of α-acetyl α-(4-bromophenyl) acetonitrile in a mixture of 110 parts by volume of ethanol and 30 parts of water, the introduction being effected at a temperature between 0° and 5° C. The mixture is then left with stirring for 30 minutes, then the mixture is poured onto 500 parts of ice and 200 parts of water.

The obtained precipitate is filtered, washed with water, then treated in 100 parts by volume of ethanol at the boiling point. The dyestuff of the formula:

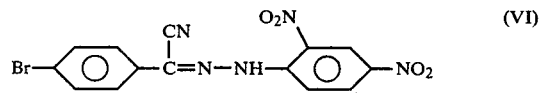

(VI)

is thus obtained, a yellow product which melts at 266° C.

| Weight analysis: | | | |
|---|---|---|---|
| | C% | H% | N% |
| Calculated for $C_{14}H_8N_5BrO_4$ | 43.08 | 2.05 | 17.95 |
| Found | 43.87 | 2.17 | 17.12 |

IR (KBr) Spectrum: 3260 cm$^{-1}$ ν(NH); 2220 cm$^{-1}$ ν(CN)

The N.M.R. spectrum of proton (60 Mc, pyridine-$D^5$ solvent) shows the aromatic H and the absence of aliphatic H.

This dyestuff exhibits a good affinity for polyester fibers which it dyes a greenish-yellow shade having excellent fastness, in particular to light, including using this dyestuff in admixture with other dyestuffs.

EXAMPLE 2

By conducting the operation as in Example 1 using 6.9 parts of 2-nitroaniline, the dyestuff of the formula:

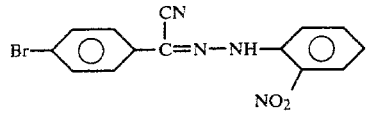
(VII)

is obtained, an orange product which melts at 202° C.

IR (KBr) Spectrum: 3270 cm$^{-1}$ $\nu$(NH); 2220 cm$^{-1}$ $\nu$(CN)

The N.M.R. spectrum of proton (60 Mc, pyridine-$D^5$ solvent) shows the aromatic H and the absence of aliphatic H.

This dyestuff dyes polyester fibers a bright yellow shade.

EXAMPLE 3

By conducting the operation as in Example 1 using 8.63 parts of 2-nitro-4-chloroaniline, the dyestuff of the formula:

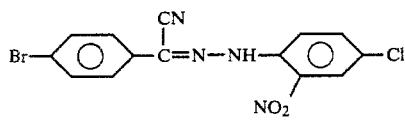
(VIII)

is obtained, a yellow product which melts at 240° C.

IR (KBr) Spectrum: 3260 cm$^{-1}$ $\nu$(NH); 2200 cm$^{-1}$ $\nu$(CN)

This dyestuff dyes polyester fibers a yellow shade.

EXAMPLE 4

The operation is conducted as in Example 1 using 7.6 parts of 2-nitro-4-methylaniline dissolved in 75 parts by volume of 94% sulfuric acid. The dyestuff of the formula:

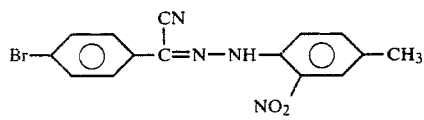
(IX)

is obtained, an orange product which melts at 230° C.

| Weight analysis: | C% | H% | N% |
| --- | --- | --- | --- |
| Calculated for $C_{15}H_{11}N_4O_2Br$ | 50.14 | 3.06 | 15.60 |
| Found | 49.96 | 3.08 | 15.80 |

IR (KBr) Spectrum: 3260 cm$^{-1}$ $\nu$(NH); 2210 cm$^{-1}$ $\nu$(CN)

The N.M.R. spectrum of proton (60 Mc, pyridine-$D^5$ solvent) shows, in addition to the aromatic H, the presence of aliphatic H of the $CH_3$ group at 2.5 ppm.

This dyestuff dyes polyester fibers a yellow shade.

EXAMPLE 5

By conducting the operation as in Example 1 using 8.4 parts of 2-nitro-4-methoxy aniline dissolved in 50 parts by volume of 94% sulfuric acid, the dyestuff of the formula:

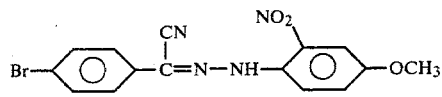
(X)

is obtained, a reddish-orange product which melts at 216° C.

IR (KBr) Spectrum: 3260 cm$^{-1}$ $\nu$(NH); 2200 cm$^{-1}$ $\nu$(CN)

This dyestuff dyes polyester fibers an orange-yellow shade.

EXAMPLE 6

The operation is conducted as in the first paragraph of Example 1 to obtain the diazo solution from 9.15 parts of 2,4-dinitroaniline. A solution comprising 10.55 parts of the sodium salt of α-acetyl α-(4-methoxy phenyl) acetonitrile in 200 parts of water is poured into the diazo solution thus formed at between 0° and 5° C.

After the mixture has been left for 30 minutes with stirring, it is poured onto 500 parts of ice and 150 parts of water. The obtained precipitate is filtered, washed with water, then treated in 100 parts by volume of ethanol at the boiling point. The dyestuff of the formula:

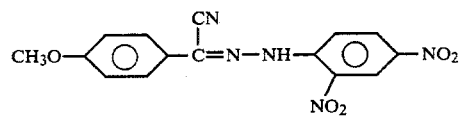
(XI)

is thus obtained, an orange-yellow product which melts at 228° C.

| Weight analysis: | C% | H% | N% |
| --- | --- | --- | --- |
| Calculated for $C_{15}H_{11}N_5O_5$ | 52.79 | 3.23 | 20.53 |
| Found | 53.2 | 3.31 | 19.86 |

IR (KBr) Spectrum: 3240 cm$^{-1}$ $\nu$(NH); 2220 cm$^{-1}$ $\nu$(CN)

The N.M.R. spectrum of proton (60 Mc, pyridine-$D^5$ solvent) shows, in addition to the aromatic H, the presence of aliphatic H of the methoxy group at 3.75 ppm.

This dyestuff exhibits an excellent affinity for polyester fibers which it dyes in yellow to orange-yellow shades according to the concentrations. The obtained dyeings exhibit excellent fastness qualities, in particular to light, including when this dyestuff is used in admixture with other dyestuffs.

EXAMPLE 7

The operation is conducted as in Example 6 using 5.23 parts of 2-nitroaniline and 8 parts of the sodium salt of α-acetyl α-(4-methoxy phenyl) acetonitrile.

The dyestuff of the formula:

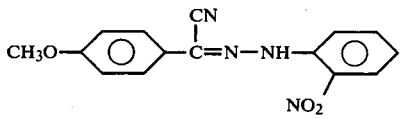 (XII)

is obtained, an orange product which melts at 152° C.

| Weight analysis: | C% | H% | N% |
|---|---|---|---|
| Calculated for $C_{15}H_{12}N_4O_3$ | 60.81 | 4.05 | 18.92 |
| Found | 61.06 | 4.14 | 18.93 |

IR (KBr) Spectrum: 3250 cm$^{-1}$ $\nu$(NH); 2200 cm$^{-1}$ $\nu$(CN)

The N.M.R. spectrum of proton (60 Mc, pyridine-D$^5$ solvent) shows, in addition to the aromatic H, the presence of the aliphatic H of the methoxy group at 3.75 ppm.

This dyestuff dyes polyester fibers an orange-yellow shade.

EXAMPLE 8

The operation is conducted as in Example 6 using 6.54 parts of 2-nitro-4-chloroaniline and 8 parts of the sodium salt of α-acetyl α-(4-methoxy phenyl) acetonitrile. The dyestuff of the formula:

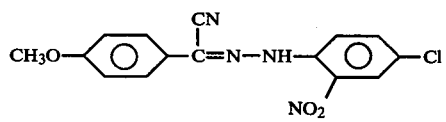 (XIII)

is obtained, an orange product which melts at 188° C.

| Weight analysis: | C% | H% | N% |
|---|---|---|---|
| Calculated for $C_{15}H_{11}N_4O_3Cl$ | 54.46 | 3.33 | 16.94 |
| Found | 55.5 | 3.53 | 16.92 |

IR (KBr) Spectrum: 3270 cm$^{-1}$ $\nu$(NH); 2220 cm$^{-1}$ $\nu$(CN)

The N.M.R. spectrum of proton (60 Mc, pyridine-D$^5$ solvent) shows, in addition to the aromatic H, the presence of the aliphatic H of the methoxy group.

This dyestuff dyes polyester fibers an orange shade.

EXAMPLE 9

The operation is carried out as in Example 6 using 5.76 parts of 2-nitro-4-methyl aniline and 8 parts of the sodium salt of α-acetyl α-(4-methoxy phenyl) acetonitrile. The dyestuff of the formula:

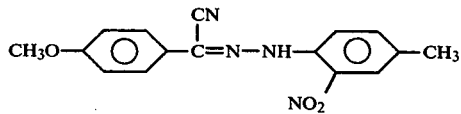 (XIV)

is obtained, an orange product which melts at 170° C.

| Weight analysis: | C% | H% | N% |
|---|---|---|---|
| Calculated for $C_{16}H_{14}N_4O_3$ | 61.94 | 4.52 | 18.06 |
| Found | 61.90 | 4.61 | 18.23 |

IR (KBr) Spectrum: 3250 cm$^{-1}$ $\nu$(NH); 2200 cm$^{-1}$ $\nu$(CN)

The N.M.R. spectrum of proton (60 Mc. pyridine-D$^5$ solvent) shows, in addition to the aromatic H, the presence of the aliphatic H of the methyl group at 2.2 ppm and of the methoxy group at 3.70 ppm.

This dyestuff dyes polyester fibers a golden yellow shade.

EXAMPLE 10

The operation is conducted as in Example 6 using 6.37 parts of 2-nitro-4-methoxy aniline and 8 parts of the sodium salt of α-acetyl α-(4-methoxy phenyl) acetonitrile. The dyestuff of the formula:

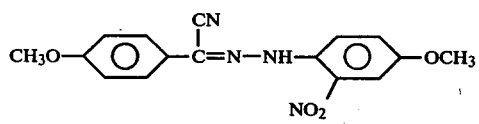 (XV)

is obtained, a product of red appearance which melts at 177° C.

IR (KBr) Spectrum: 3260 cm$^{-1}$ $\nu$(NH); 2210 cm$^{-1}$ $\nu$(CN)

This dyestuff dyes polyester fibers a reddish-orange shade.

EXAMPLE 11

The operation is conducted as in Example 6 using 9.15 parts of 2,4-dinitroaniline and 10.67 parts of the sodium salt of α-acetyl α-(3-chlorophenyl) acetonitrile. The dyestuff of the formula:

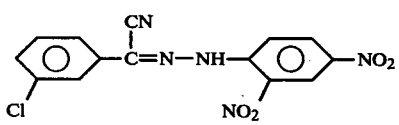 (XVI)

is obtained, a yellow product which melts at 251° C.

| Weight analysis: | C% | H% | N% |
|---|---|---|---|
| Calculated for $C_{14}H_8N_5O_4Cl$ | 48.63 | 2.32 | 20.26 |
| Found | 49.16 | 2.35 | 20.12 |

IR (KBr) Spectrum: 3240 cm$^{-1}$ $\nu$(NH); 2200 cm$^{-1}$ $\nu$(CN)

This dyestuff dyes polyester fibers a yellow shade.

EXAMPLE 12

The operation is conducted as in Example 6 using 6.9 parts of 2-nitroaniline and 10.67 parts of the sodium salt of α-acetyl α-(3-chlorophenyl) acetonitrile. The dyestuff of the formula:

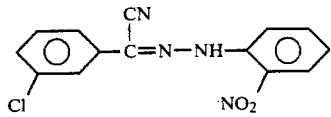 (XVII)

is obtained, a yellow product which melts at 191° C.

Weight analysis:

|  | C% | H% | N% |
|---|---|---|---|
| Calculated for $C_{14}H_9N_4O_2Cl$ | 55.91 | 3.00 | 18.64 |
| Found | 55.97 | 3.02 | 18.61 |

IR (KBr) Spectrum: 3260 cm$^{-1}$ $\nu$(NH); 2200 cm$^{-1}$ $\nu$(CN)

This dyestuff dyes polyester fibers a yellow shade.

EXAMPLE 13

The operation is conducted as in Example 6 from 8.63 parts of 2-nitro-4-chloroaniline and 10.67 parts of the sodium salt of α-acetyl α-(3-chlorophenyl) acetonitrile. The dyestuff of the formula:

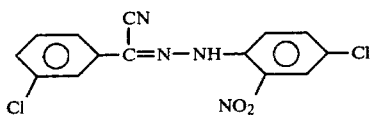 (XVIII)

is obtained, an orange-yellow product which melts at 204° C.

Weight analysis:

|  | C% | H% | N% |
|---|---|---|---|
| Calculated for $C_{14}H_8N_4O_2Cl_2$ | 50.15 | 2.39 | 16.72 |
| Found | 50.56 | 2.52 | 16.24 |

IR (KBr) Spectrum: 3260 cm$^{-1}$ $\nu$(NH); 2220 cm$^{-1}$ $\nu$(CN)

This dyestuff dyes polyester fibers a yellow shade.

EXAMPLE 14

The operation is conducted as in Example 6 using 7.6 parts of 2-nitro-4-methyl aniline and 10.67 parts of the sodium salt of α-acetyl α-(3-chlorophenyl) acetonitrile. The dyestuff of the formula:

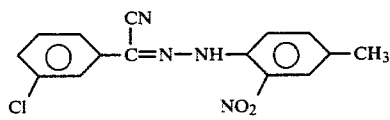 (XIX)

is obtained, an orange-yellow product which melts at 221° C.

Weight analysis:

|  | C% | H% | N% |
|---|---|---|---|
| Calculated for $C_{15}H_{11}N_4O_2Cl$ | 57.23 | 3.50 | 17.81 |
| Found | 57.01 | 3.47 | 17.89 |

IR (KBr) Spectrum: 3270 cm$^{-1}$ $\nu$(NH); 2220 cm$^{-1}$ $\nu$(CN)

This dyestuff dyes polyester fibers a yellow shade.

EXAMPLE 15

The operation is conducted as in Example 6 using 8.4 parts of 2-nitro-4-methoxy aniline and 10.67 parts of the sodium salt of α-acetyl α-(3-chlorophenyl) acetonitrile. The dyestuff of the formula:

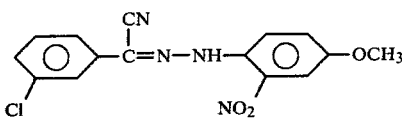 (XX)

is obtained, an orange product which melts at 174° C.

Weight analysis:

|  | C% | H% | N% |
|---|---|---|---|
| Calculated for $C_{15}H_{11}N_4O_3Cl$ | 54.46 | 3.33 | 16.94 |
| Found | 54.64 | 3.42 | 17.20 |

IR (KBr) Spectrum: 3240 cm$^{-1}$ $\nu$(NH); 2200 cm$^{-1}$ $\nu$(CN)

This dyestuff dyes polyester fibers an orange-yellow shade.

EXAMPLE 16

The operation is conducted as in Example 6 using 9.15 parts of 2,4-dinitroaniline and 10.78 parts of the sodium salt of α-acetyl α-(4-chlorophenyl) acetonitrile. The dyestuff of the formula:

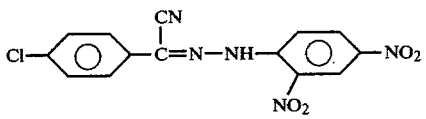 (XXI)

is obtained, a yellow product which melts at 258° C.

IR (KBr) Spectrum: 3220 cm$^{-1}$ $\nu$(NH); 2200 cm$^{-1}$ $\nu$(CN)

This dyestuff dyes polyester fibers a greenish-yellow shade.

EXAMPLE 17

The operation is conducted as in Example 6 using 6.9 parts of 2-nitroaniline and 10.78 parts of the sodium salt of α-acetyl α-(4-chlorophenyl) acetonitrile. The dyestuff of the formula:

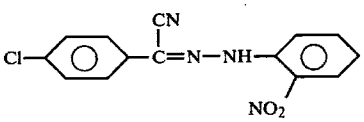 (XXII)

is obtained, a yellow product which melts at 199° C.

IR (KBr) Spectrum: 3250 cm$^{-1}$ $\nu$(NH); 2200 cm$^{-1}$ $\nu$(CN)

This dyestuff dyes polyester fibers a yellow shade.

EXAMPLE 18

The operation is conducted as in Example 6 using 9.15 parts parts of 2,4-dinitroaniline and 9.73 parts of the sodium salt of α-acetyl α-(4-methyl phenyl) acetonitrile. The dyestuff of the formula:

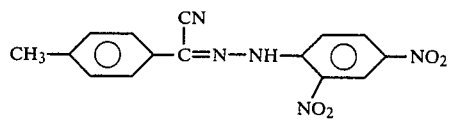

is obtained, a yellow product which melts at 250° C.

IR (KBr) Spectrum: 3220 cm$^{-1}$ $\nu$(NH); 2200 cm$^{-1}$ $\nu$(CN)

This dyestuff dyes polyester fibers a yellow shade.

EXAMPLE 19

The operation is conducted as in Example 6 using 6.9 parts of 2-nitroaniline and 9.73 parts of the sodium salt of α-acetyl α-(4-methyl phenyl) acetonitrile. The dyestuff of the formula:

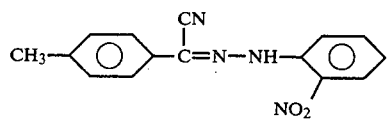

is obtained, a yellow product which melts at 188° C.

IR (KBr) Spectrum: 3260 cm$^{-1}$ $\nu$(NH); 2200 cm$^{-1}$ $\nu$(CN)

This dyestuff dyes polyester fibers a yellow shade.

EXAMPLE 20

The operation is conducted as in Example 6 using 7.6 parts of 2-nitro-4-methyl aniline and 9.73 parts of the sodium salt of α-acetyl α-(4-methyl phenyl) acetonitrile. The dyestuff of the formula:

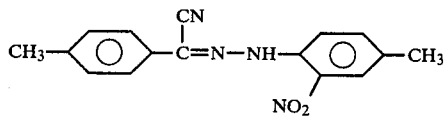

is obtained, a yellow product which melts at 182° C.

| Weight analysis: | C% | H% | N% |
|---|---|---|---|
| Calculated for C$_{16}$H$_{14}$N$_4$O$_2$ | 65.31 | 4.76 | 19.05 |
| Found | 66.02 | 4.81 | 18.95 |

IR (KBr) Spectrum: 3240 cm$^{-1}$ $\nu$(NH); 2200 cm$^{-1}$ $\nu$(CN)

This dyestuff dyes polyester fibers a yellow shade.

EXAMPLE 21

The operation is conducted as in Example 6 using 9.15 parts of 2,4-dinitroaniline and 12.05 parts of the sodium salt of α-acetyl α-(3,4-dimethoxy phenyl) acetonitrile. The dyestuff of the formula:

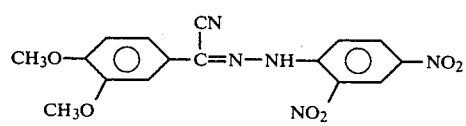

is obtained, a product of a chestnut-orange appearance which melts at 208° C.

| Weight analysis: | C% | H% | N% |
|---|---|---|---|
| Calculated for C$_{16}$H$_{13}$O$_6$N$_5$ | 51.75 | 3.50 | 18.86 |
| Found | 52.00 | 3.39 | 18.18 |

IR (KBr) Spectrum: 3250 cm$^{-1}$ $\nu$(NH); 2220 cm$^{-1}$ $\nu$(CN)

This dyestuff dyes polyester fibers an orange-yellow shade.

EXAMPLE 22

The operation is conducted as in Example 6 using 6.9 parts of 2-nitroaniline and 12.05 parts of the sodium salt of α-acetyl α-(3,4-dimethoxy phenyl) acetonitrile. The dyestuff of the formula:

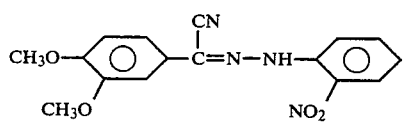

is obtained, a product of orange appearance which melts at 213° C.

| Weight analysis: | C% | H% | N% |
|---|---|---|---|
| Calculated for C$_{16}$H$_{14}$O$_4$N$_4$ | 58.90 | 4.29 | 17.17 |
| Found | 58.80 | 4.28 | 17.19 |

IR (KBr) Spectrum: 3280 cm$^{-1}$ $\nu$(NH); 2220 cm$^{-1}$ $\nu$(CN)

This dyestuff dyes polyester fibers an orange-yellow shade.

EXAMPLE 23

The operation is conducted as in Example 6 using 8.63 parts of 2-nitro-4-chloroaniline and 12.1 parts of the sodium salt of α-acetyl α-(3,4-dimethoxy phenyl) acetonitrile. The dyestuff of the formula:

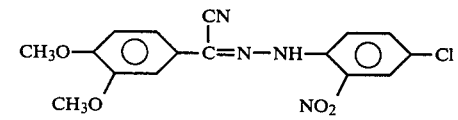

is obtained, a product of a reddish-orange appearance which melts at 218° C.

| Weight analysis: | C% | H% | N% |
|---|---|---|---|
| Calculated for C$_{16}$H$_{13}$N$_4$O$_4$Cl | 53.25 | 3.60 | 15.53 |
| Found | 53.80 | 3.48 | 15.28 |

IR (KBr) Spectrum: 3250 cm$^{-1}$ $\nu$(NH); 2210 cm$^{-1}$ $\nu$(CN)

This dyestuff dyes polyester fibers an orange-yellow shade.

EXAMPLE 24

The operation is conducted as in Example 6 using 7.6 parts of 2-nitro-4-methyl aniline and 12.05 parts of the sodium salt of α-acetyl α-(3,4-dimethoxy phenyl) acetonitrile. The dyestuff of the formula:

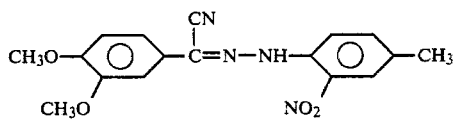 (XXIX)

is obtained, a product of a reddish appearance which melts at 213° C.

Weight analysis:

|  | C% | H% | N% |
|---|---|---|---|
| Calculated for C₁₇H₁₆N₄O₄ | 60 | 4.70 | 16.47 |
| Found | 59.57 | 4.48 | 16.51 |

IR (KBr) Spectrum: 3260 cm⁻¹ ν(NH); 2200 cm⁻¹ ν(CN)

This dyestuff dyes polyester fibers an orange-yellow shade.

EXAMPLE 25

The operation is conducted as in Example 6 using 8.4 parts of 2-nitro-4-methoxy aniline and 12.1 parts of the sodium salt of α-acetyl α-(3,4-dimethoxy phenyl) acetonitrile. The dyestuff of the formula:

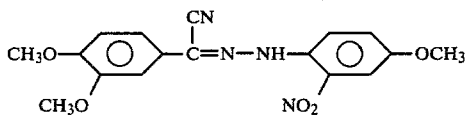 (XXX)

is obtained, a product of reddish appearance which melts at 201° C.

Weight analysis:

|  | C% | H% | N% |
|---|---|---|---|
| Calculated for C₁₇H₁₆N₄O₅ | 57.30 | 4.49 | 15.73 |
| Found | 57.52 | 4.51 | 15.74 |

IR (KBr) Spectrum: 3250 cm⁻¹ ν(NH); 2200 cm⁻¹ ν(CN)

This dyestuff dyes polyester fibers a reddish-orange shade.

EXAMPLE 26

4 Parts of the dyestuff described in Example 1, 2 parts of dispersant of the lignosulfonate type and the necessary amount of water and acetic acid to bring the pH to 6-7 and the weight to 80 parts are ground.

By means of the dispersion thus obtained, which contains 5% of the dyestuff of Example 1, two dye baths are prepared having the following composition:

| 5% Dispersion | 0.9 or 3 parts |
|---|---|
| Water | 100 parts |
| 10% Acetic acid | 0.5 part |
| 10% ethoxylated castor oil (Sunaptol LT) | 1 part |

Introduced into each bath are 5 parts of ethylene glycol polyterephthalate fibers, then the mixture is heated in an autoclave up to 120° C. or 130° C. and maintained at this temperature for one hour. After dyeing, the fibers are treated for 5 minutes at 80°–85° C. in an aqueous solution of sodium hydrosulfite.

The fibers are dyed deep yellow shades with excellent fastness qualities, especially to light.

EXAMPLES 27 TO 35

Other examples of compounds according to the invention, which correspond to the formula:

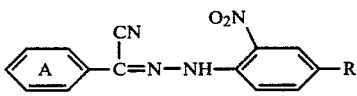 (XXXI)

and have been prepared by operating as in Example 6 from the corresponding 2-nitro-4-R-aniline and the sodium salt of the corresponding α-acetyl α-aryl acetonitrile, are summarized in the following Table 1. Other analytical data regarding the compounds of Examples 27 to 35 are given in the following Table 2.

TABLE 1

| Example | A | R | Melting point in °C. | Shade on Polyester |
|---|---|---|---|---|
| 27 | p-chloro-phenyl | methoxy | 219 | orange yellow |
| 28 | p-chloro-phenyl | chloro | 217 | yellow |
| 29 | m-tolyl | nitro | 233 | yellow |
| 30 | m-tolyl | methoxy | 152 | orange yellow |
| 31 | o-tolyl | nitro | 211 | yellow |
| 32 | o-tolyl | methoxy | 164 | orange yelllow |
| 33 | p-fluoro-phenyl | nitro | 241 | yellow |
| 34 | p-fluoro-phenyl | methoxy | 197 | orange yellow |
| 35 | p-fluoro-phenyl | chloro | 201 | yellow |

TABLE 2

| Compound of Example | | Weight Analysis | | | IR Spectrum (KBr) | |
|---|---|---|---|---|---|---|
| | | C% | H% | N% | ν(NH) | ν(CN) |
| 27 | Calculated | 54.46 | 3.33 | 16.94 | | |
| | Found | 54.54 | 3.29 | 16.97 | 3240cm⁻¹ | 2200cm⁻¹ |
| 28 | Calculated | 50.15 | 2.39 | 16.72 | | |
| | Found | 50.33 | 2.57 | 16.52 | 3250cm⁻¹ | 2210cm⁻¹ |
| 29 | Calculated | 55.38 | 3.38 | 21.54 | | |
| | Found | 55.56 | 3.57 | 21.70 | 3240cm⁻¹ | 2200cm⁻¹ |
| 30 | Calculated | 61.94 | 4.52 | 18.06 | | |
| | Found | 62.57 | 4.46 | 17.84 | 3260cm⁻¹ | 2200cm⁻¹ |
| 31 | Calculated | 55.38 | 3.38 | 21.54 | | |
| | Found | 55.69 | 3.35 | 20.98 | 3250cm⁻¹ | 2220cm⁻¹ |
| 32 | Calculated | 61.94 | 4.52 | 18.06 | | |
| | Found | 61.57 | 4.62 | 17.39 | 3250cm⁻¹ | 2210cm⁻¹ |
| 33 | Calculated | 51.06 | 2.43 | 21.27 | | |
| | Found | 50.97 | 2.66 | 21.11 | 3250cm⁻¹ | 2220cm⁻¹ |
| 34 | Calculated | 57.32 | 3.50 | 17.83 | | |
| | Found | 57.71 | 3.59 | 17.93 | 3240cm⁻¹ | 2200cm⁻¹ |
| 35 | Calculated | 52.74 | 2.51 | 17.58 | | |
| | Found | 52.70 | 2.48 | 17.50 | 3260cm⁻¹ | 2220cm⁻¹ |

What is claimed is:

1. An α-hydrazono α-phenyl acetonitrile of the formula:

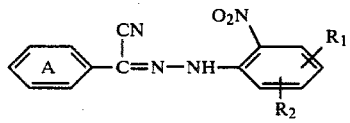 (I)

in which R₁ represents hydrogen, halogen, nitro, trifluoromethyl, alkyl or alkoxy, R₂ represents hydrogen, halogen or cyano, and the benzene nucleus A carries 1 to 3 identical or different substituents selected from halogen, trifluoromethyl, alkyl, alkoxy and —NR$_3$R$_4$, R$_3$ representing alkyl or substituted alkyl and R$_4$ representing hydrogen, alkyl or substituted alkyl.

2. Compound according to claim 1 in which the halogen is chlorine or bromine.

3. Compound according to claim 2 in which the alkyl or alkoxy groups contain 1 to 4 carbon atoms.

4. Compound according to claim 1 in which the alkyl or alkoxy groups contain 1 to 4 carbon atoms.

5. Compound according to claim 1 in which the alkyl groups represented by R$_3$ and R$_4$ are substituted by halogen, hydroxy, acyloxy, carbalkoxy, cyano or alkoxy.

6. Compound according to claim 4 in which the benzene nucleus A carries one or two substituents.

7. Compound according to claim 3 in which the benzene nucleus A carries one or two substituents.

8. Compound according to claim 2 in which the benzene nucleus A carries one or two substituents.

9. Compound according to claim 1 in which the benzene nucleus A carries one or two substituents.

10. Compound according to claim 4 in which the nucleus A carries a chlorine atom in position 3 or 4, a bromine atom in position 4, or a methoxy group in position 4, or two methoxy groups in positions 3 and 4.

11. Compound according to claim 3 in which the nucleus A carries a chlorine atom in position 3 or 4, a bromine atom in position 4, or a methoxy group in position 4, or two methoxy groups in positions 3 and 4.

12. Compound according to claim 2 in which the nucleus A carries a chlorine atom in position 3 or 4, a bromine atom in position 4, or a methoxy group in position 4, or two methoxy groups in positions 3 and 4.

13. Compound according to claim 1 in which the nucleus A carries a chlorine atom in position 3 or 4, a bromine atom in position 4, or a methoxy group in position 4, or two methoxy groups in positions 3 and 4.

14. Compound according to claim 1, 2, 4, 7, 8, 9, or 10 in which R$_1$ is a nitro group fixed in para position to the —NH— group and R$_2$ is a hydrogen atom.

15. Process for the preparation of the compound according to claim 1 which comprises reacting the diazo derivative of an o-nitro-aniline of the formula:

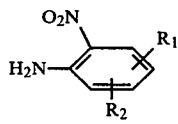

with a compound of the formula:

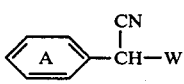

in which W represents an eliminable electro-attracting group.

16. Process according to claim 15 in which W is the acetyl group.

17. A compound according to claim 1 which has the formula:

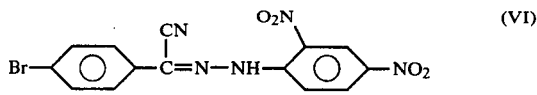

18. A compound according to claim 1 which has the formula:

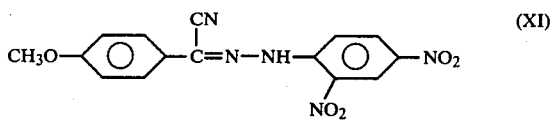

19. A compound according to claim 1 which has the formula:

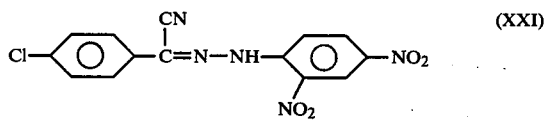

20. A compound according to claim 1 which has the formula:

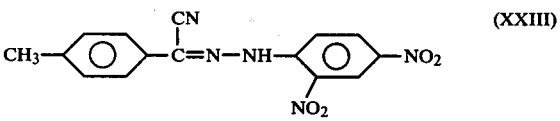

21. A compound according to claim 1 which has the formula:

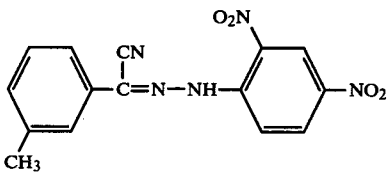

22. The process for the coloration of artificial or synthetic materials which comprises applying to said materials as dispersed dyestuff the compound according to claim 14.

23. The process for the coloration of artificial or synthetic materials which comprises applying to said materials as dispersed dyestuff the compound according to claim 1, 2, 3, 4, 5, 6, 7, 8, 9, 10, 11, 12 or 13.

* * * * *